United States Patent Office 3,533,300
Patented Oct. 13, 1970

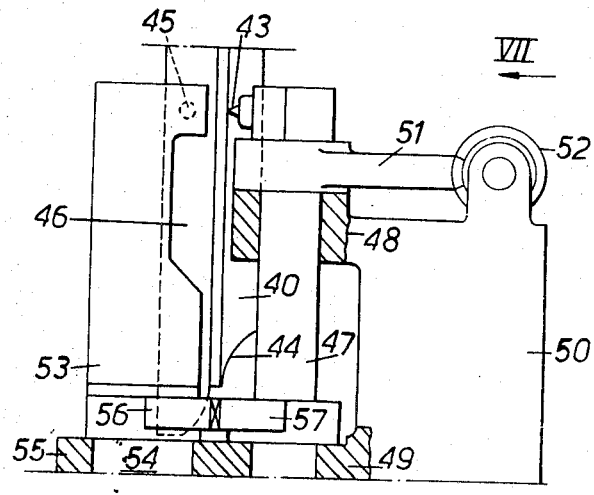
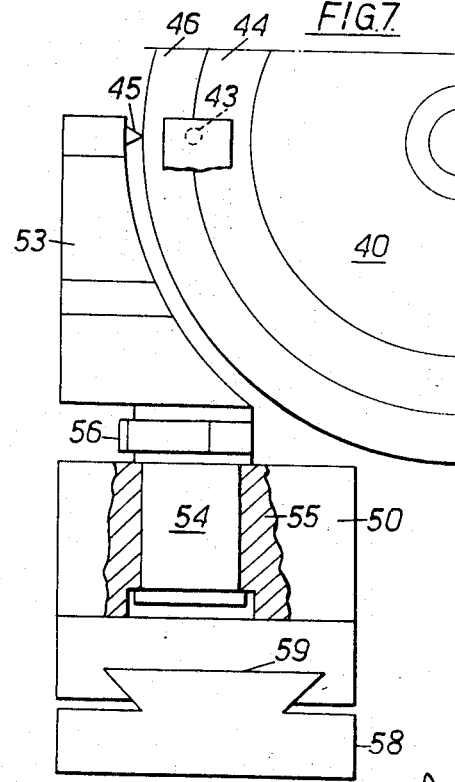

3,533,300
HELICAL GEARING
Robert Martin Studer, Bristol, England, assignor to Rolls-Royce Limited, Derby, England, a British company
Filed Aug. 29, 1968, Ser. No. 756,277
Claims priority, application Great Britain, Sept. 4, 1967, 40,259/67
Int. Cl. B24b 55/04; F16h 55/06
U.S. Cl. 74—462                                   3 Claims

ABSTRACT OF THE DISCLOSURE

A non-conjugative gear of the Novikov type wherein the tooth profile includes an addendum having convex flanks and a dedendum having concave flanks, the width of said addendum at the pitch circle being less than, and the adjacent width of the dedendum being greater than, a mean value.

This invention relates to nonconjugate helical gearing of the type known as Novikov gearing, or as Wildhaber gearing.

Although the basic forms of such gearing have been known since the publication of Wildhaber's U.S. Pat. No. 1,601,750 in 1926, only little material use appears to have been made of this form of gearing up to the present time. This may well be due to certain shortcomings discussed below.

In non-conjugate gearing of the Novikov type the tooth flanks are of circular arc profile and any two mating tooth flanks are respectively convex and concave. In Novikov gearing the flanks have high surface strength and failure of the tooth is more likely to take place in bending fracture rather than in surface deterioration. This is particularly the case with hardened gears. It is an object of this invention to provide non-conjugate gearing of improved bending strength so that the bending strength of the teeth more nearly matches their surface strength.

Non-conjugate tooth forms can be made in single-flank and in double-flank configuration. In the single flank form the teeth of the one gear of a pair are situated outside the pitch circle of the gear and have on each side one convex flank. The teeth of the other gear are situated inside the pitch circle thereof and have on each side a concave flank. In this form, only one pair of teeth are, for most of the time, in torque transmitting engagement, and this is a particular source of weakness in bending.

It has been suggested to improve the bending strength of the teeth by adopting the double-flank form. In this form each gear of a pair has teeth which have two flanks at each side of their profile. The one flank is convex and extends outside the pitch circle while the other flank is concave and extends inside the pitch circle. The double-flank tooth may therefore be said to have both an addendum and a dedendum. It is a characteristic of double-flank gearing that at least two pairs of teeth are in torque-transmitting engagement at any one time during operation. In other words, the load is shared between two teeth and the bending strength is therefore higher. However, although the load is distributed between two teeth, the bending strength is not doubled because the double-flank profile is relatively long and slender and its cantilever strength is correspondingly diminished. It is a more specific object of the invention to provide double-flank non-conjugate gearing of improved bending strength.

It is known in Novikov gearing that if the two mating concave and convex flanks are of close conformity the gears are particularly sensitive to variations in their centre distance. It has therefore been proposed to decrease the radius of curvature of the convex flanks relative to the corresponding radius of the concave flank. This provides the gears with a measure of tolerance to centre distance variation but at a corresponding sacrifice in surface strength. In the case of single-flank teeth, only a small measure of centre distance tolerance is attainable in this way, because the fact that generally the whole load is carried by a single tooth pair means that the surface stress quickly reaches a value at which there is little advantage in the use of non-conjugate gearing over more conventional gearing, e.g. involute gearing. In the double-flank tooth form the load is shared between two pairs of teeth; the surface stress is correspondingly lower and, for the same surface stress, the disconformity between the mating flanks, and thus the tolerance to centre distance variations, can be made much higher. It is also an object of this invention to retain this advantage of the double-flank system and at the same time enhance the tooth bending strength.

It is also among the objects of this invention to provide a method of, and apparatus, for producing the improved gearing.

According to this invention, a gear of the Novikov type, wherein the tooth profile includes an addendum having convex flanks and a dedendum having concave flanks, is characterised in that the width of the addendum at the pitch circle is less than, and the width of the dedendum is greater than, a mean value.

A tooth profile dimensioned in accordance with this invention conforms more nearly to the profile of a uniformly stressed cantilever than the known profile, and is accordingly stronger in bending.

An example of gearing according to this invention will now be described with reference to the accompanying drawings wherein:

FIG. 6 is an elevation of FIG. 5; and

FIG. 7 is a view in the direction of the arrow VII in FIG. 6, partly in section and showing a selected part only.

Figure 1:
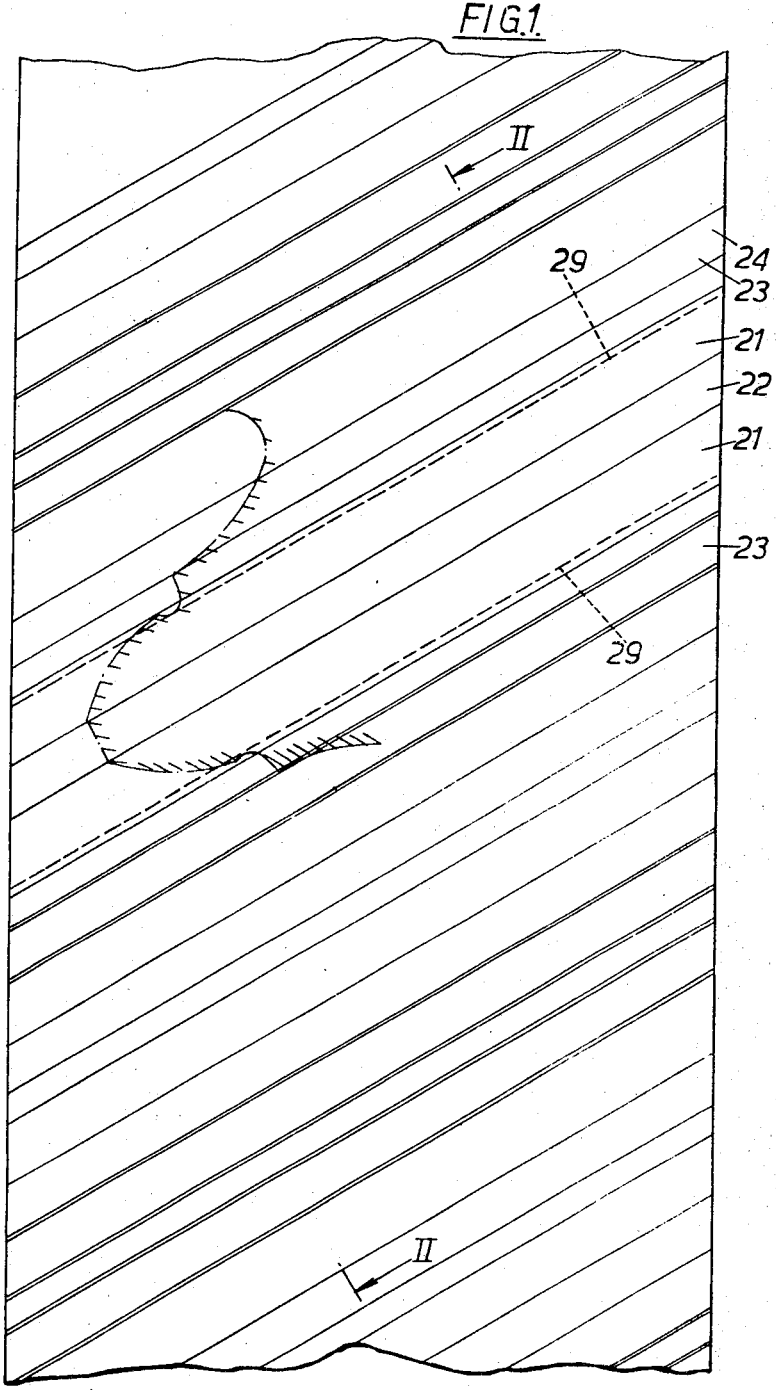
FIG. 1 is a developed view of a portion of a gear.
Figure 2:
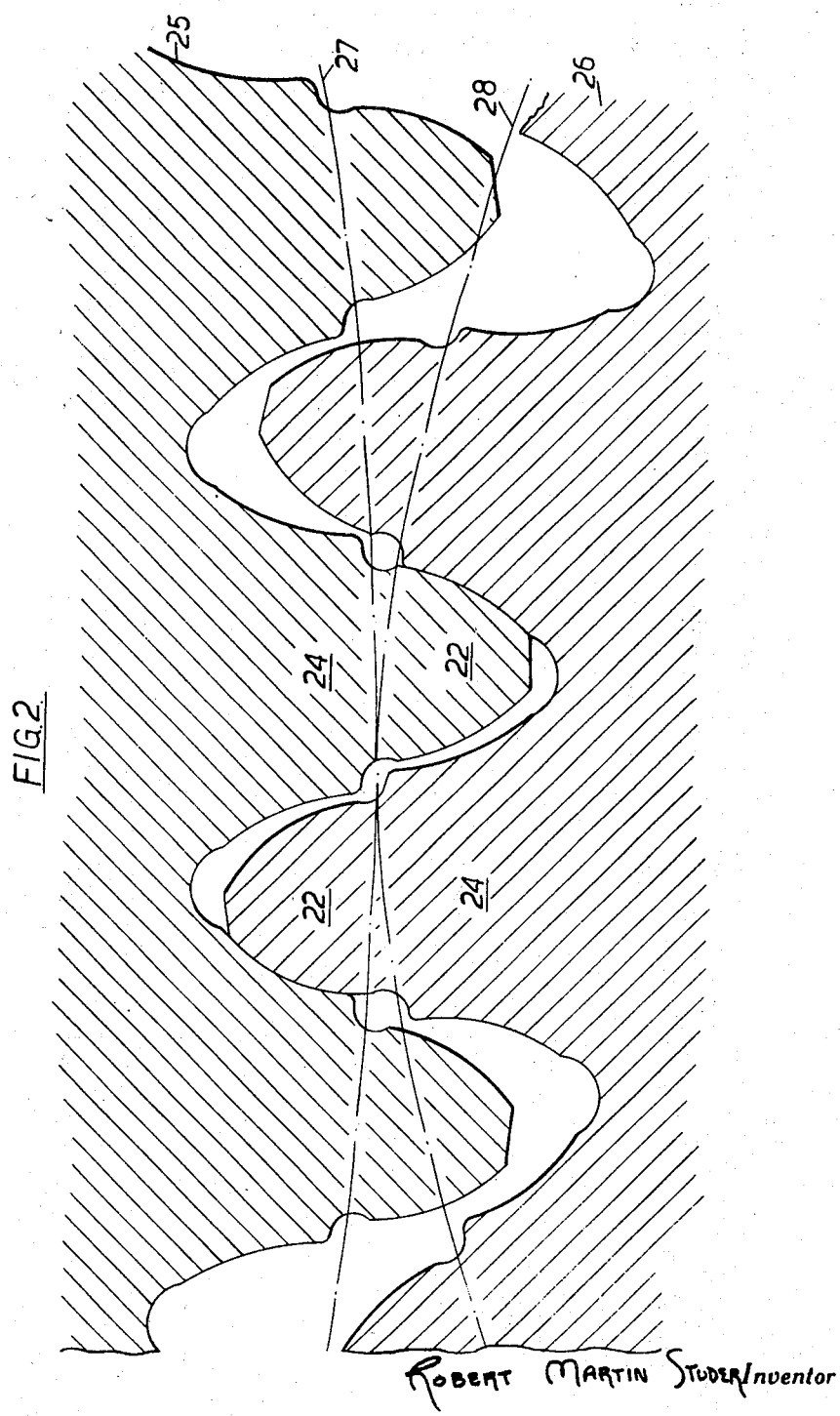
FIG. 2 is a section on the line II—II in FIG. 1 and further showing the gear in mesh with another gear.
Figure 3:
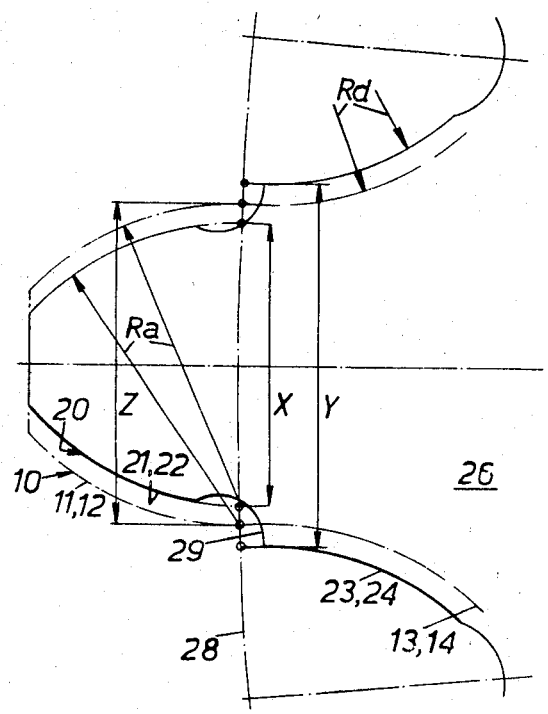
FIG. 3 is an enlarged view of a single tooth of either of the gears shown in FIG. 2.

Referring to FIG. 1 to 3, the gearing teeth each have a profile 20 defined by convex sides 21 of an addendum 22, and concave sides 23 of a dedendum 24. The two gears (FIG. 2) are denoted 25, 26 respectively and their pitch circles are denoted 27, 28 respectively.

Referring to FIG. 3 the dividing line between the addenum 22 and the dedenum 24 is the pitch circle 28. The addendum is so proportioned that its width X at the pitch circle is less than the pitch circle width Z of a mean profile 10. The dedendum is so proportioned that its width Y at the pitch circle is greater than the width Z. The profile 10 is determined by the circular pitch of the teeth and is in fact the profile of the known form of double-flank tooth.

The flanks 12 of the mean profile 10 are arcs of radius R$a$ centred on the pitch circle. The flanks 22 of the profile 20 are arcs of the same radium R$a$ and also centred on the pitch circle. The same applies to radii R$d$ in respect of the flanks 14, 24. As explained above, R$a$ is slightly less than R$d$.

The ratio between the widths X and Y is so chosen that the maximum bending stress in the addendum is substantially equal to the maximum bending stress in the dedendum. It is clear that a tooth made according to the mean profile 10 must have a bending stress which rises to a maximum at a point well within the pitch circle. The tooth made according to the profile 20 exhibits a bending stress which is more nearly uniform over the height of the tooth and whose maximum (for the same load) is less than that in the profile 10. Photo-elastic tests have shown that generally optimum conditions are realised when the ratio of X to Y is approximately 1:1.3.

To reduce stress concentration effects at the juncture of the flanks 22, 24, these two flanks have formed between them a fillet curve 29.

It can be deduced from experimental results that the improved tooth has greater load-carrying capacity than prior double-flank Novikov gearing and also than comparable involute gearing. In relation to single-flank Novikov gearing, the improvement in load-carrying capacity is of the order of 100% whilst in relation to involute gearing, both as regards surface and bending strengths, the improvement could be as much as 30%. Hence for the same load there is a corresponding reduction in the size of the gears so that the improved gearing has gearwheels whose diameter could be 50% of that of the single-flank non-conjugate gearing and possibly 75% of that of involute gearing.

The relatively small gear sizes suggested by the improved tooth form can in practice be achieved as it is a general characteristic of non-conjugate gearing that the least possible number of teeth is substantially less than in the case of involute gearing.

Figure 4:
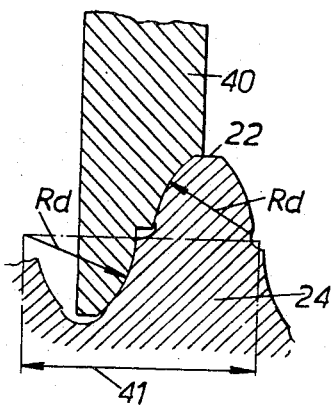
FIG. 4 is a view of a single tooth of either of the gears shown in FIG. 2 and further showing, in section, a grinding wheel for grinding the profile of the tooth.

Referring to FIG. 4, it will be seen that the adjacent flanks of the improved tooth profile can be ground in one operation by an appropriately formed grinding wheel 40 to produce circular arcs in planes normal to the helical tooth. In this connection it is important that the chordal pitch distance, 41, for the centres of the radii $Ra$ and $Rd$ is the same for all teeth of both meshing gears. This can be ensured by using the same grinding wheel for both gears and thus producing matched gears. The same grinding wheel is also used for both sides of each tooth.

Figure 5:
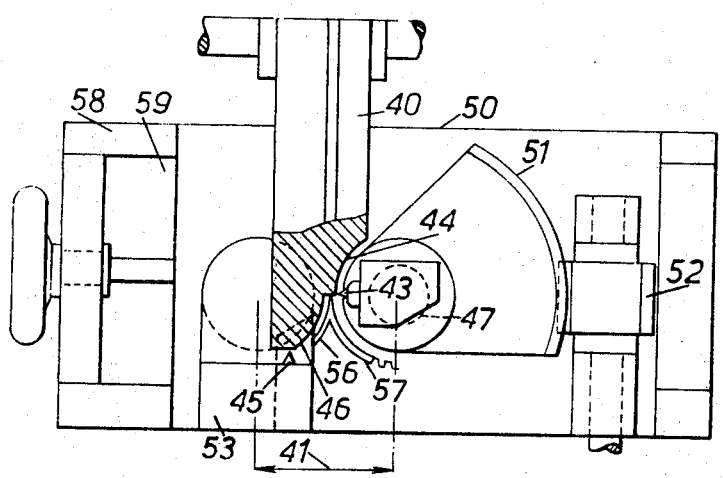
FIG. 5 is a plan view of apparatus for dressing the grinding wheel shown in FIG. 4.

To ensure that the grinding wheel itself is accurately dressed and that its form can be maintained, use may be made of a wheel dressing device as shown in FIGS. 5 and 7.

This device has two dressing diamonds 43, 45 for those portions 44, 46 of the grinding wheel that are respectively concerned with the convex and concave flanks of the tooth form. The diamond 43 is secured to a pivot pin 47 supported in bearings 48, 49 (FIG. 6) in a frame 50, for rotation by means of a worm wheel 51 meshing with a worm 52 adapted to be rotated by a hand wheel (not shown). It is clear that rotation of the diamond 43 about the axis of the pin 47 causes the arcuate portion 44 to be produced on the profile of the grinding wheel. The diamond 45 is secured to an arm 53 supported by a pivot pin 54 in a bearing 55 in the frame. The centre distance between the pivot pins 47, 54 is made to be equal to the centre distance 41 of the radii $Ra$ and $Rd$ (FIG. 4). The arm 53 is connected to the pin 47 by gear segments 56, 57 so that the diamond 45 is moved along the portion 46 of the grinding wheel profile as the diamond 43 is moved along the portion 44. Instead of being geared together in this way, the pins 47, 54 may be mounted to be independent of one another, the pin 47 being mounted on a slide (not shown) whereby its centre distance from the pin 54 can be adjusted. The frame 50 is supported on a base 58 by means of slide ways 59 so that the diamonds 43, 45 can be fed into engagement with the wheel 40.

The significance of the dressing device is that it enables the two portions 44, 46 of the wheel to be dressed without disturbing the centre distance 41.

I claim:
1. A non-conjugate gear of the Novikov type wherein the tooth profile includes an addendum having convex flanks and a dedendum having concave flanks, characterised in that the width of the addendum at the pitch circle is less than, and the adjacent width of the dedendum is greater than, a mean value.

2. A gear according to claim 1 wherein the ratio of the adjacent widths of the addendum and dedendum is approximately 1:1.3.

3. Apparatus for dressing a grinding wheel adapted to simultaneously grind adjacent addendum and dedendum flanks of the tooth profile of a gear, said profile having convex addendum flanks and concave redendum flanks, comprising: two dressing tools, and separate pivot means supporting the tools for arcuate motion along the profile of an addendum and the adjacent dedendum, respectively, of a tooth.

References Cited
UNITED STATES PATENTS

| | | | |
|---|---|---|---|
| 466,923 | 1/1892 | Price | 74—462 |
| 1,613,702 | 1/1927 | Hammar | 74—462 |
| 2,436,231 | 2/1948 | Schellens | 172—278 |
| 2,990,724 | 4/1961 | Anderson et al. | 74—462 |
| 3,371,552 | 3/1968 | Soper | 74—462 |

LEONARD H. GERIN, Primary Examiner

U.S. Cl. X.R.

125—11